(12) United States Patent
Noguchi et al.

(10) Patent No.: US 10,360,100 B2
(45) Date of Patent: Jul. 23, 2019

(54) CACHE MEMORY SYSTEM AND PROCESSOR SYSTEM

(71) Applicant: Kabushiki Kaisha Toshiba, Tokyo (JP)

(72) Inventors: Hiroki Noguchi, Kanagawa (JP); Shinobu Fujita, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/262,413

(22) Filed: Sep. 12, 2016

(65) Prior Publication Data

US 2017/0075756 A1 Mar. 16, 2017

(30) Foreign Application Priority Data

Sep. 16, 2015 (JP) .................................. 2015-183193

(51) Int. Cl.
*G06F 11/10* (2006.01)
*G06F 12/0866* (2016.01)

(52) U.S. Cl.
CPC ...... *G06F 11/1064* (2013.01); *G06F 12/0866* (2013.01); *G06F 2212/1021* (2013.01); *G06F 2212/1032* (2013.01); *G06F 2212/202* (2013.01); *G06F 2212/608* (2013.01)

(58) Field of Classification Search
CPC ............. G06F 11/1076; G06F 11/1008; G06F 11/106; G06F 11/1064; G06F 12/0866; G06F 2212/608; G06F 2212/202; G06F 2212/1032; G06F 2212/1021; H05K 999/99; G11C 2029/0411

USPC .......................................................... 714/764
See application file for complete search history.

(56) References Cited

U.S. PATENT DOCUMENTS

| | | | |
|---|---|---|---|
| 6,804,799 B2 | 10/2004 | Zuraski, Jr. | |
| 6,961,890 B2 | 11/2005 | Smith | |
| 7,210,077 B2 | 4/2007 | Brandenberger et al. | |
| 7,673,216 B2 | 3/2010 | Hino et al. | |
| 8,719,663 B2 * | 5/2014 | Li | G06F 11/1072 714/704 |
| 8,755,233 B2 | 6/2014 | Nagashima | |
| 2007/0266291 A1 | 11/2007 | Toda et al. | |
| 2008/0072120 A1 * | 3/2008 | Radke | G06F 11/1068 714/768 |

(Continued)

FOREIGN PATENT DOCUMENTS

| | | |
|---|---|---|
| JP | 2003-131954 | 5/2003 |
| JP | 2004-531837 | 10/2004 |

(Continued)

*Primary Examiner* — Samir W Rizk
*Assistant Examiner* — Enam Ahmed
(74) *Attorney, Agent, or Firm* — Finnegan, Henderson, Farabow, Garrett & Dunner, L.L.P.

(57) ABSTRACT

A cache memory system has a nonvolatile memory which includes a first region and a second region, the first region storing readable and writable data, the second region storing an ECC for correcting an error of the data in the first region, an error corrector which generates the ECC and carries out an error correction of the data in the first region with the ECC, error rate determination circuitry which determines an error rate of the data in the first region, and region size adjustment circuitry which adjusts a size of the second region inside the nonvolatile memory based on the error rate.

15 Claims, 10 Drawing Sheets

(56) References Cited

U.S. PATENT DOCUMENTS

| | | | |
|---|---|---|---|
| 2008/0298468 A1* | 12/2008 | Narahari | H04N 21/4382 375/240.25 |
| 2010/0122148 A1* | 5/2010 | Flynn | G06F 11/108 714/773 |
| 2011/0239081 A1 | 9/2011 | Hida et al. | |
| 2012/0254686 A1 | 10/2012 | Esumi et al. | |
| 2013/0138870 A1 | 5/2013 | Yoon et al. | |
| 2014/0136883 A1* | 5/2014 | Cohen | G06F 11/2094 714/6.11 |
| 2014/0372831 A1* | 12/2014 | Oh | G06F 11/1012 714/764 |
| 2015/0143037 A1* | 5/2015 | Smith | G06F 3/061 711/103 |
| 2015/0248328 A1* | 9/2015 | Yoon | G06F 11/1008 714/764 |
| 2015/0364218 A1* | 12/2015 | Frayer | G11C 29/44 714/6.13 |
| 2016/0034344 A1* | 2/2016 | Hoekstra | G06F 11/1064 714/764 |
| 2016/0162358 A1* | 6/2016 | Shirai | G06F 11/1048 714/764 |
| 2016/0170871 A1* | 6/2016 | Hyun | G06F 3/0679 711/103 |
| 2017/0147262 A1* | 5/2017 | Lee | G06F 3/0604 |

FOREIGN PATENT DOCUMENTS

| | | |
|---|---|---|
| JP | 2005-216301 | 8/2005 |
| JP | 2007-41932 | 2/2007 |
| JP | 2007-305267 | 11/2007 |
| JP | 2008-226188 | 9/2008 |
| JP | 2010-256944 | 11/2010 |
| JP | 2011-198272 | 10/2011 |
| JP | 2012-94132 | 5/2012 |
| JP | 2012-203692 | 10/2012 |
| JP | 2013-114679 | 6/2013 |
| JP | 2013-120426 | 6/2013 |
| JP | 2014-186614 | 10/2014 |
| WO | WO-2014/088747 | 6/2014 |

* cited by examiner

CACHE MEMORY SYSTEM AND PROCESSOR SYSTEM

CROSS REFERENCE TO RELATED APPLICATIONS

This application is based upon and claims the benefit of priority from the prior Japanese Patent Application No. 2015-183193, filed on Sep. 16, 2015, the entire contents of which are incorporated herein by reference.

FIELD

An embodiment relates to a cache memory system including a nonvolatile memory.

BACKGROUND

Since a static random access memory (SRAM) is large in standby energy and high in price, cache memories using nonvolatile memories have been taken into consideration. Among the nonvolatile memories, a magnetoresistive random access memory (MRAM) has high rewriting resistance, and is capable of realizing small cell size and high integration. However, from a point of view of access speed, the SRAM is far beyond the MRAM.

Furthermore, the nonvolatile memories such as the MRAM and the like use condition varieties of configuration materials so as to retain data logics. Therefore, an occurrence rate of errors (hereinafter, error rate) becomes high due to access frequency, aged deterioration, and environmental changes such as temperatures and humidity.

DETAILED DESCRIPTION

According to one embodiment, a cache memory system has a nonvolatile memory which includes a first region and a second region, the first region storing readable and writable data, the second region storing an ECC (Error Correcting Code) for correcting an error of the data in the first region, an error corrector which generates the ECC and carries out an error correction of the data in the first region with the ECC, error rate determination circuitry which determines an error rate of the data in the first region, and region size adjustment circuitry which adjusts a size of the second region inside the nonvolatile memory based on the error rate.

Figure 1:
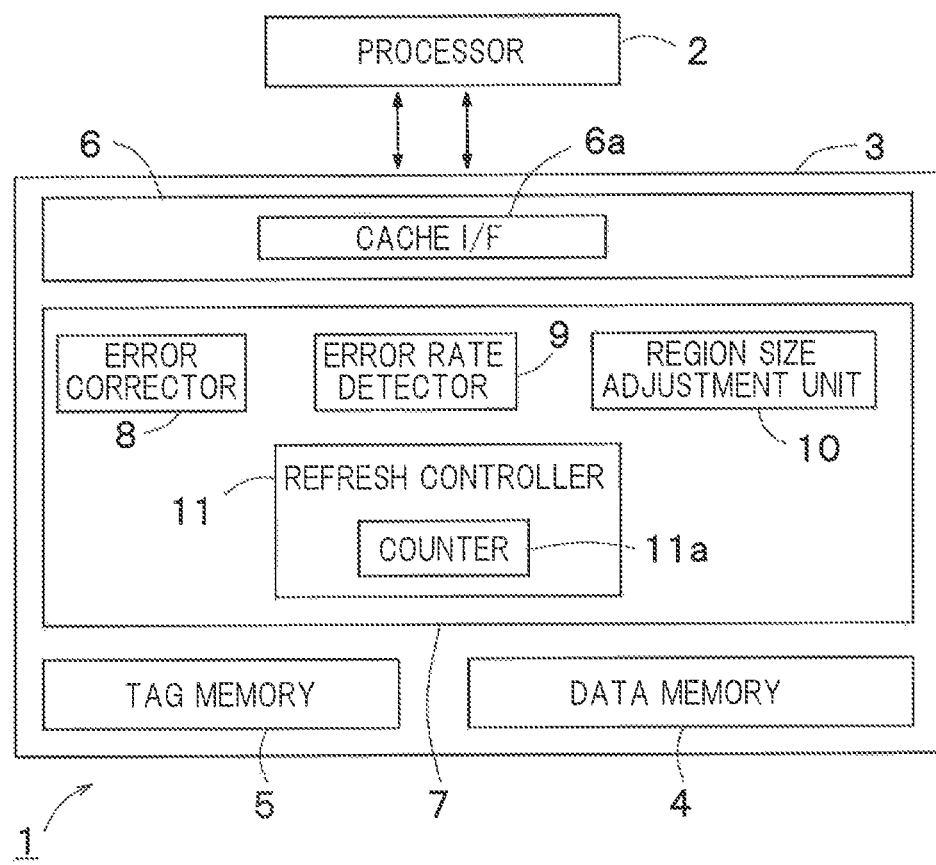
FIG. 1 is a block diagram illustrating a schematic configuration of a cache memory system of an embodiment.

Hereinafter, an embodiment will be described with reference to the accompanying drawings. FIG. 1 is a block diagram illustrating a schematic configuration of a cache memory system 1 of an embodiment. The cache memory system 1 in FIG. 1 includes a cache memory 3 connected to a processor 2. The processor 2 has a built-in core not illustrated and a built-in primary cache memory (hereinafter, L1 cache) not illustrated. A processor system is configured with the cache memory system 1 and the processor 2.

The cache memory 3 in FIG. 1 includes a nonvolatile memory such as an MRAM and the like. The cache memory 3 in FIG. 1 may be a hierarchical cache memory 3 with two hierarchies or more. However, for sake of simplicity, hereinafter described is an example where the cache memory 3 in FIG. 1 is a secondary cache memory (hereinafter, L2 cache). This L2 cache memory 3 is coupled to a main memory not illustrated.

The cache memory 3 in FIG. 1 includes a data memory 4, a tag memory 5, a cache controller 6, and a reliability control unit 7.

The data memory 4 stores data, for example, per 512-bit cache line. As described later, the data memory 4 includes a first region and a second region. The first region stores data which is to be read and written by the processor 2, while the second region stores error correcting codes for correcting data errors in the first region. The tag memory 5 stores address information and the like of each cache line of the data memory 4.

The cache controller 6 includes a cache interface unit (cache I/F) 6a which sends and receives data between the processor 2. The cache controller 6 writes data on the L2 cache and reads out data from the L2 cache in accordance with an address to which the processor 2 has issued an access request.

The reliability control unit 7 includes an error corrector 8, an error rate detector (error rate determination circuitry) 9, and a region size adjustment unit (region size adjustment circuitry) 10.

The error corrector 8 generates error correcting codes (ECC) necessary for an error correction of data of each cache line in the data memory 4. Furthermore, the error corrector 8 carries out the error correction of the data of each cache line with the ECCs.

The error rate detector 9 detects an error rate of the data of each cache line of the first region inside the data memory 4. The region size adjustment unit 10 adjusts a size of the second region inside the nonvolatile memory based on the error rate detected by the error rate detector 9.

In addition, the reliability control unit 7 may include a refresh control unit (control unit) 11. The refresh control unit 11 periodically reads out data written on the first region inside the data memory 4 and supplies the data to the error corrector 8. The error corrector 8 detects whether there is any error in the data readout by the refresh control unit 11. If there is an error, the error corrector 8 then carries out the error correction.

Figure 2:
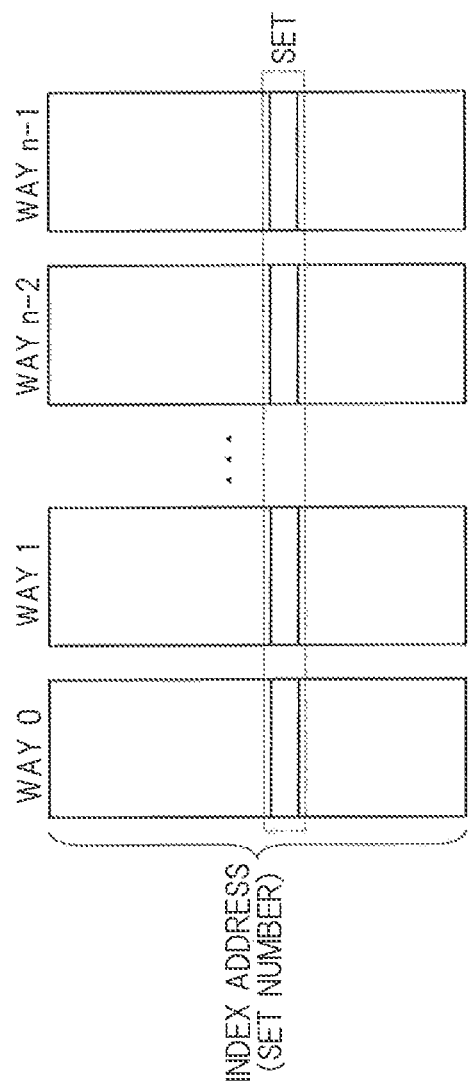
FIG. 2 is a view illustrating a structure of a set associative cache memory.

The cache memory 3 according to the present embodiment has a set associative structure. FIG. 2 is a view illustrating a structure of the set associative cache memory 3. As illustrated in FIG. 2, the cache memory 3 according to the present embodiment is separated into a plurality of ways. Each way has a data-bit width equivalent to the cache line. A specific set of the plurality of ways is selected by an index address which is a part of the address to which the processor 2 has issued the access request. The specific set includes the cache lines equivalent to a plurality of way numbers. The cache line is, for example, 512 bits.

In the present embodiment, among the cache lines equivalent to the plurality of way numbers selected by the index address, any numbers of ways can be used as the second region for storing ECCs. The way numbers which are to be used as the second region may be changeable per index address, that is, per set. In this manner, sizes of the first region and the second region can be made changeable and adjustable per set in each way in the present embodiment.

Figure 3:
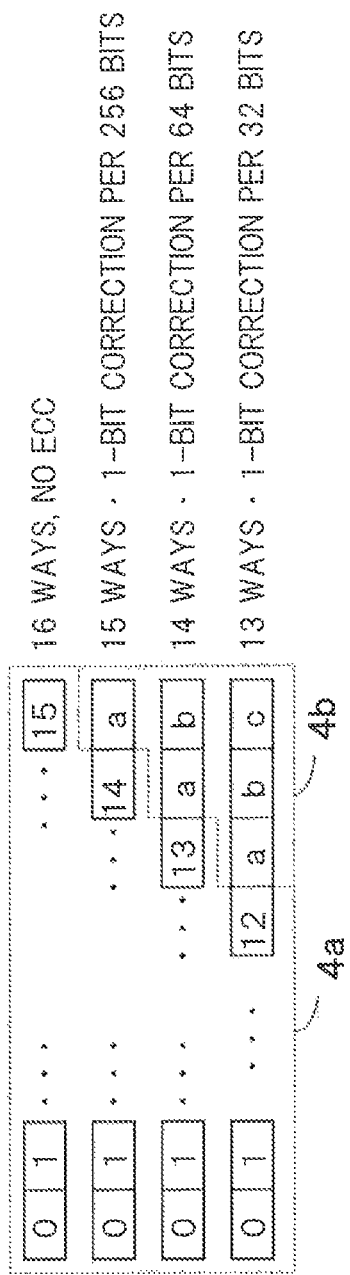
FIGS. 3A to 3D are views illustrating examples of changing sizes of a first region and a second region.

FIG. 3A is an example where all 16 ways are used as a first region 4a. FIG. 3B is an example where 15 ways among the 16 ways are used as the first region 4a, and the remaining one way is used as a second region 4b. FIG. 3C is an example where 14 ways among the 16 ways are used as the first region 4a, and the remaining two ways are used as the second region 4b. FIG. 3D is an example where 13 ways among the 16 ways are used as the first region 4a, and the remaining three ways are used as the second region 4b.

In a case of FIG. 3B, for example, the error correction for 1 bit is possible per 256 bits of data in the first region 4a. In other words, considering that one cache line (one way) is 512 bits, one way is divided into half of a data-bit width so as to carry out the error correction for 1 bit per divided region (256 bits). Therefore, the error correction for 2 bits is possible in one way.

In a case of FIG. 3C, for example, the error correction for 1 bit is possible per 64 bits of the data in the first region 4a. In this case, one way is divided into eight regions so as to carry out the error correction for 1 bit per divided region (64 bits). Therefore, the error correction for 8 bits is possible in one way.

In a case of FIG. 3D, for example, the error correction for 1 bit is possible per 32 bits of the data in the first region 4a. In this case, one way is divided into sixteen regions so as to carry out the error correction for 1 bit per divided region (32 bits). Therefore, the error correction for 16 bits is possible in one way.

In the present embodiment, as mentioned later, the error rate is detected per set, and the sizes (memory capacity) of the first region 4a and the second region 4b are adjusted per set in each way based on the error rates. Accordingly, with regard to a set with a high error rate, the larger the size of the second region 4b is, the more errors can be corrected. Therefore, it is possible to prevent reliability of the non-volatile memory from falling.

Figure 4:
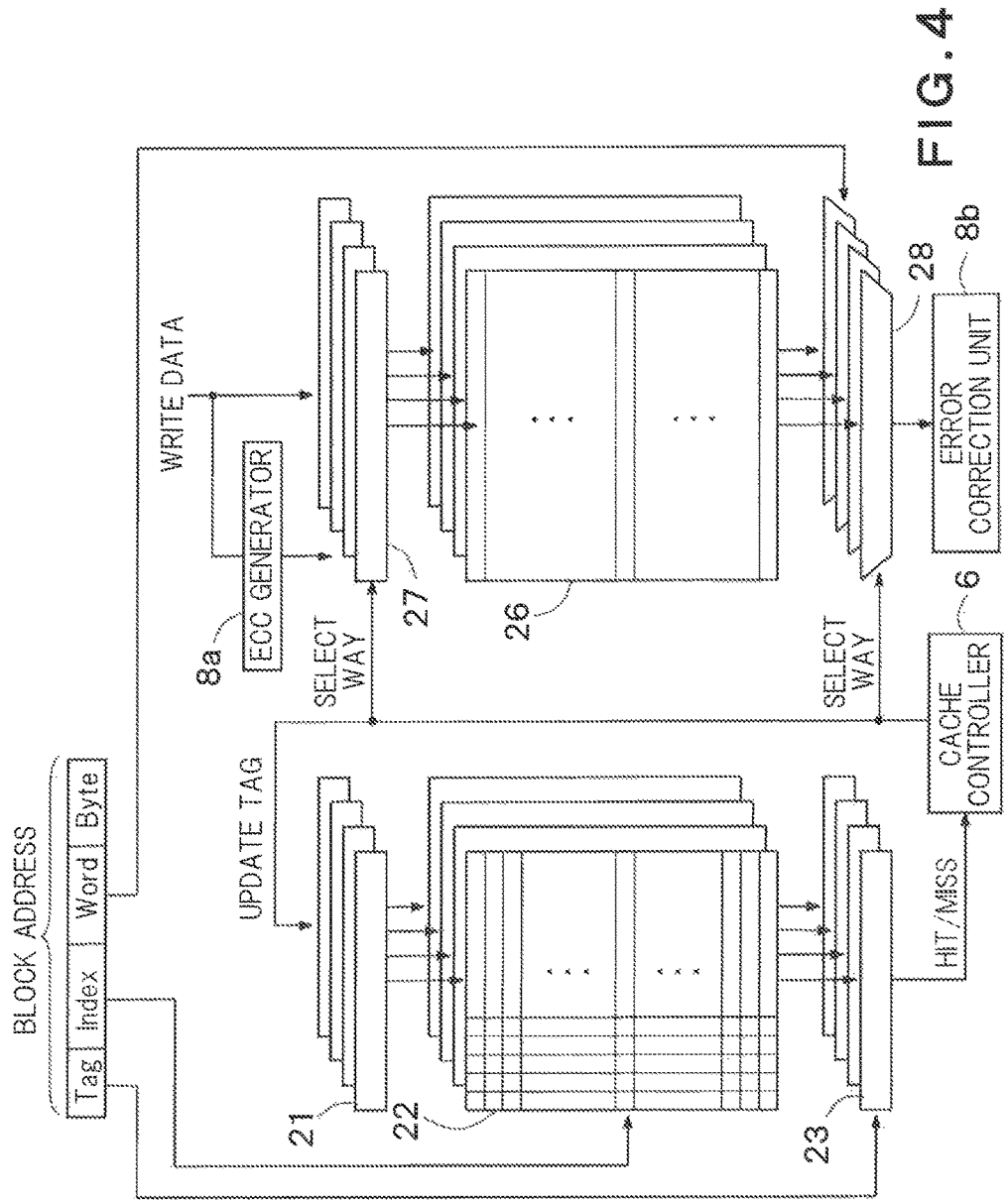
FIG. 4 is a block diagram illustrating an inner configuration of the cache memory in more detail.

FIG. 4 is a block diagram illustrating an inner configuration of the cache memory 3 in more detail. The tag memory 5 includes a tag address selection unit 21, a tag information storage unit 22, and a hit determination unit 23. The tag address selection unit 21 selects a way which should be readout and supplies address information to the selected way. The tag information storage unit 22 stores tag information corresponding to each data inside the data memory 4. The hit determination unit 23 compares tag information readout from the tag information storage unit 22 and the index address in a block address to which the processor 2 has issued the access request. The hit determination unit 23 then outputs hit/miss determination signals.

The tag information storage unit 22 stores information (ECC flag information, first information) which indicates whether the data in the first region 4a has the second region 4b as well as the address information of the data in the first region 4a and also stores information (second information) which specifies a way used as the second region 4b.

The data memory 4 includes a data storage unit 26, a writing unit 27, and a reading unit 28. The data storage unit 26 has the plurality of ways divided therein and writes or reads out data per way. The writing unit 27 selects a way which should be written on the data memory 4 and supplies data which should be written on the selected way. The reading unit 28 selects a way which should be readout from the data memory 4 and supplies data which should be readout from the selected way.

The ECC generator 8a and the error correction unit 8b in FIG. 4 are built in the error corrector 8 in FIG. 1. The ECC generator 8a generates ECCs of data which should be written on the data memory 4. The error correction unit 8b carries out the error correction of the readout data from the data memory 4.

Figure 5:
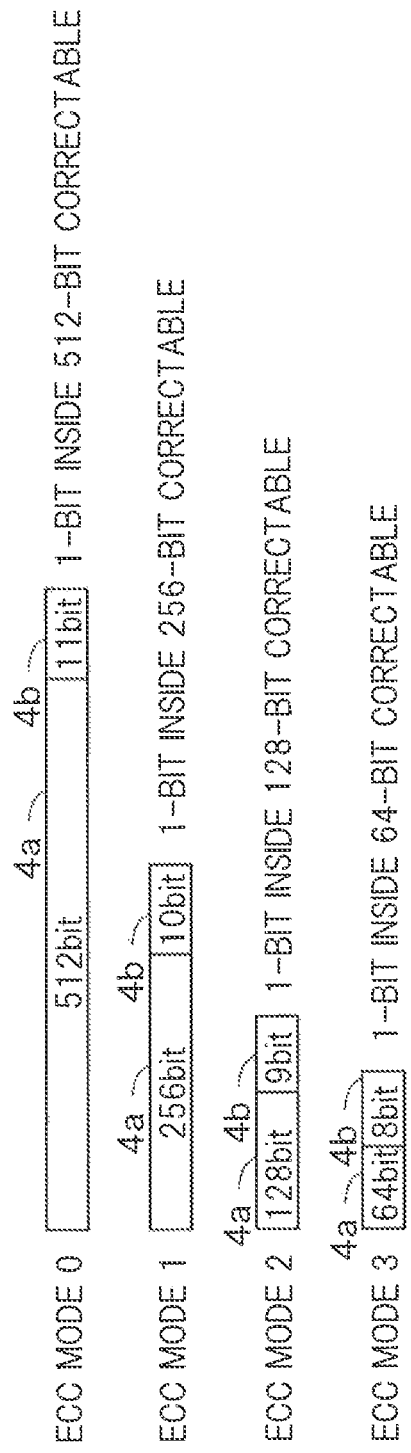
FIG. 5 is a view illustrating a relationship between a bit number of data and a correctable bit number.

FIG. 5 is a view illustrating a relationship between a bit number of data and a correctable bit number. FIG. 5 illustrates an example where one way (cache line) is 512 bits. In the present embodiment, performance of the error correction is set to be changeable. Each different performance of the error correction is represented by an ECC mode 1 to an ECC mode 4.

The ECC mode 1 corrects 1-bit errors in 512-bit data. In order to correct the 1-bit errors in the 512-bit data, for example, 11-bit ECCs are necessary. Therefore, in order to correct the 1-bit errors with regard to each of the 15 ways, it is necessary to store ECCs of 11×15=165 bits in the second region 4b.

The ECC mode 2 corrects 1-bit errors in 256-bit data. In order to correct the 1-bit errors in the 256-bit data, for example, 10-bit ECCs are necessary. Accordingly, in the 512-bit data, 2-bit errors can be corrected. To correct the 2-bit errors, ECCs of 10×2=20 bits are necessary. Therefore, in order to correct errors of up to 2 bits with regard to each of the 15 ways in the first region 4a, it is necessary to store ECCs of 20×15=300 bits in the second region 4b.

The ECC mode 3 corrects 1-bit errors in 128-bit data. In order to correct the 1-bit errors in the 128-bit data, for example, 9-bit ECCs are necessary. Accordingly, in the 512-bit data, 4-bit errors can be corrected. To correct the 4-bit errors, ECCs of 9×4=36 bits are necessary. Therefore, considering that the first region 4a includes 15 ways, when correcting errors of up to 4 bits per way, it is necessary to store ECCs of 36×15=540 bits in the second region 4b. In a case where the second region 4b includes one way, information of 512 bits can be stored at maximum. Accordingly, two ways are necessary for the second region 4b. In this case, the first region 4a includes 14 ways and the second region 4b stores ECCs of 36×14=504 bits.

The ECC mode 4 corrects 1-bit errors in 64-bit data. In order to correct the 1-bit errors in the 64-bit data, for example, 8-bit ECCs are necessary. Accordingly, in the 512-bit data, 8-bit errors can be corrected. To correct the 8-bit errors, ECCs of 8×8=64 bits are necessary. Considering that the first region 4a includes 14 ways, it is necessary to store ECCs of 64×14=896 bits in the second region 4b.

In this manner, necessary bit numbers of the ECCs differ depending on the performance of the error correction. Therefore, it is necessary to make the sizes of the first region 4a and the second region 4b changeable and adjustable in accordance with the performance of the error correction. This adjustment is carried out by the region size adjustment unit 10 in FIG. 1.

Figure 6:
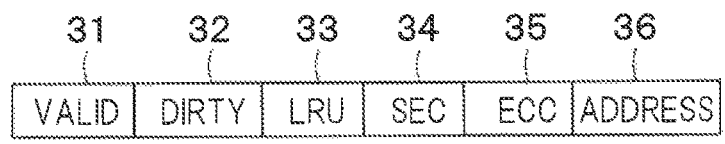
FIG. 6 is a view illustrating detailed information of tag information stored in a tag information storage unit inside a tag memory.

FIG. 6 is a view illustrating detailed information of tag information stored in the tag information storage unit 22 inside the tag memory 5. The tag information storage unit 22 stores the tag information per set. The tag information includes, as illustrated in FIG. 6, valid information 31, dirty information 32, LRU information 33, sec information 34, ECC flag information 35, and address information 36.

The valid information 31 indicates whether the corresponding data in the first region 4a is valid. The dirty information 32 indicates whether it is necessary to write back the corresponding data in the first region 4a on a lower-level memory. The LRU information 33 indicates whether the corresponding data in the first region 4a is a least recently used (LRU) data. The sec information 34 is security information of the corresponding data in the first region 4a. The ECC flag information stores information indicating whether the corresponding data in the first region 4a also includes the second region 4b as well as the first region 4a. The ECC flag information 35 may include information specifying the error correction mode (hereinafter, ECC mode) indicating the performance of the error correction and also rotation information of the second region 4b. The ECC mode selects any one of a plurality of modes including, for example, the four modes in FIG. 5. In a case of eight modes in total, for example, 3 bits are necessary for the ECC mode. The rotation information periodically shifts the second region 4b which stores the ECCs inside the nonvolatile memory. As a result, it is possible to even access frequency inside the nonvolatile memory and to enhance writing resistance of the nonvolatile memory. For example, in a case where the cache memory 3 includes 16 ways and each way is set to be used as the second region 4b in turn, since there are 16 choices, 4 bits are necessary for selecting any one of those ways.

Accordingly, what are necessary in the ECC flag information 35 are, for example, 3 bits for the ECC mode and 4 bits for the rotation information, that is, 7 bits at minimum.

The reliability control unit 7 detects an error rate of readout data with the error rate detector 9 when carrying out refresh for the nonvolatile memory by the refresh control unit 11. The reliability control unit 7 can adjust the sizes of the first region 4a and the second region 4b with the region size adjustment unit 10 based on the detected error rate.

Figure 7:
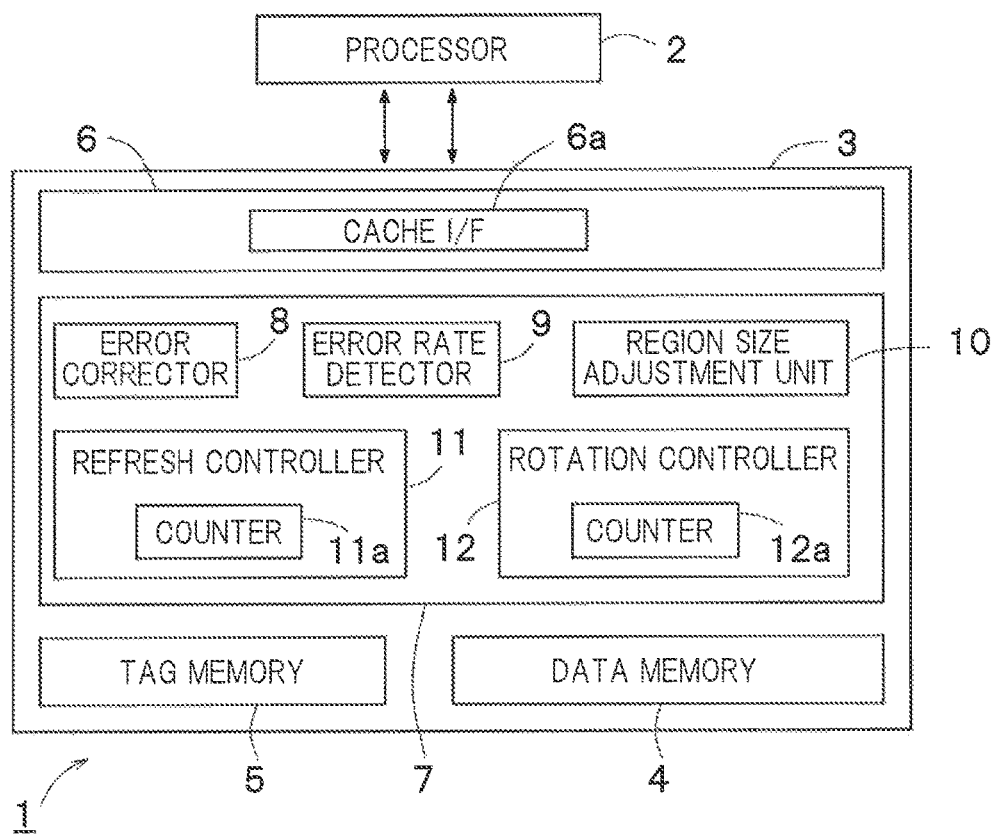
FIG. 7 is a block diagram illustrating that a rotation control unit is added to FIG. 1.

In order to carry out rotation of the second region 4b, as illustrated in FIG. 7, a rotation control unit 12 and a counter 12a for rotation control (access frequency measurement unit) are preferably provided inside the reliability control unit 7. This counter 12a measures access frequency of the second region 4b. The rotation control unit 12 shifts the second region 4b into a different way when the access frequency measured by the counter 12a exceeds a predetermined threshold.

Figure 8:
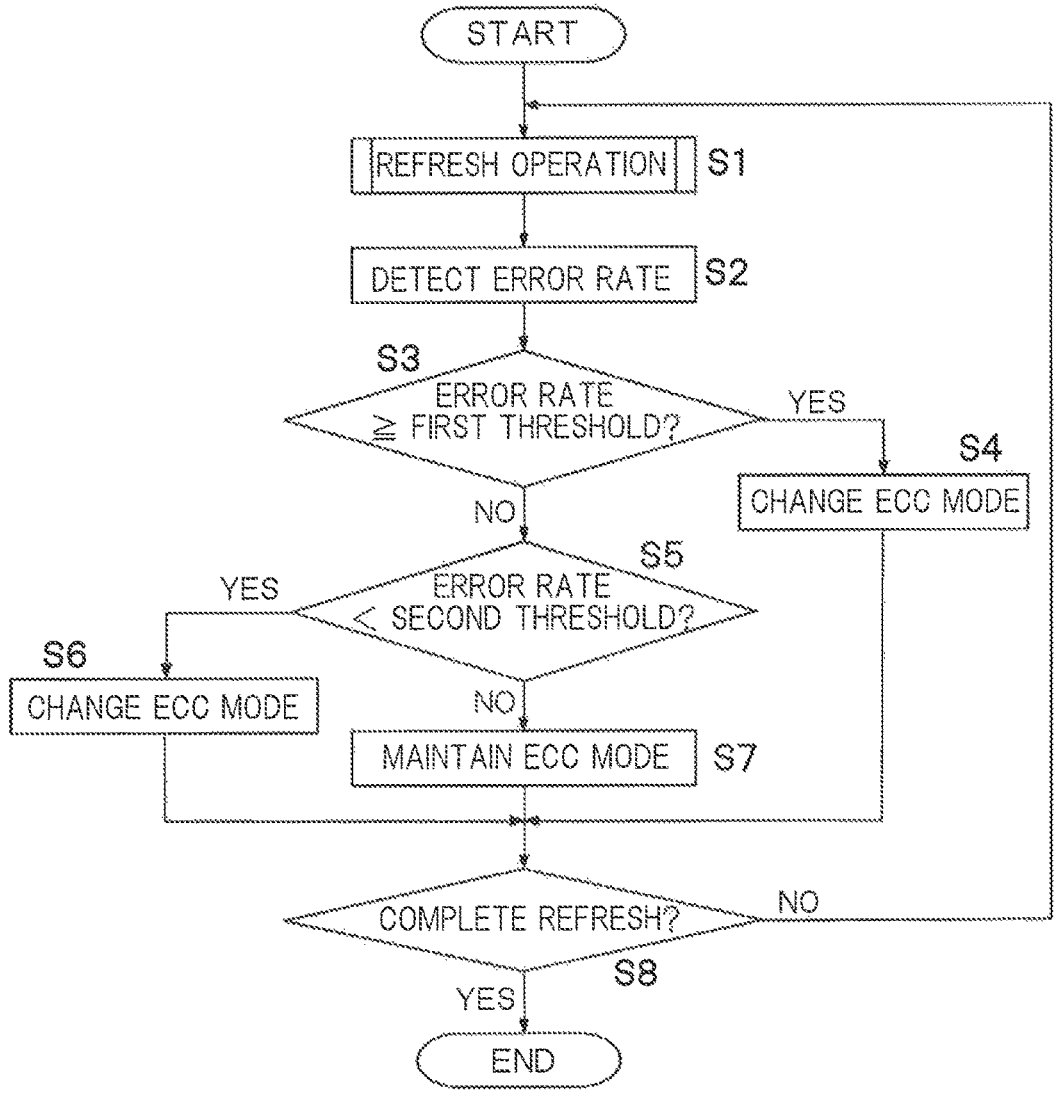
FIG. 8 is a flow chart illustrating a first example of process operations of a reliability control unit.
Figure 9:
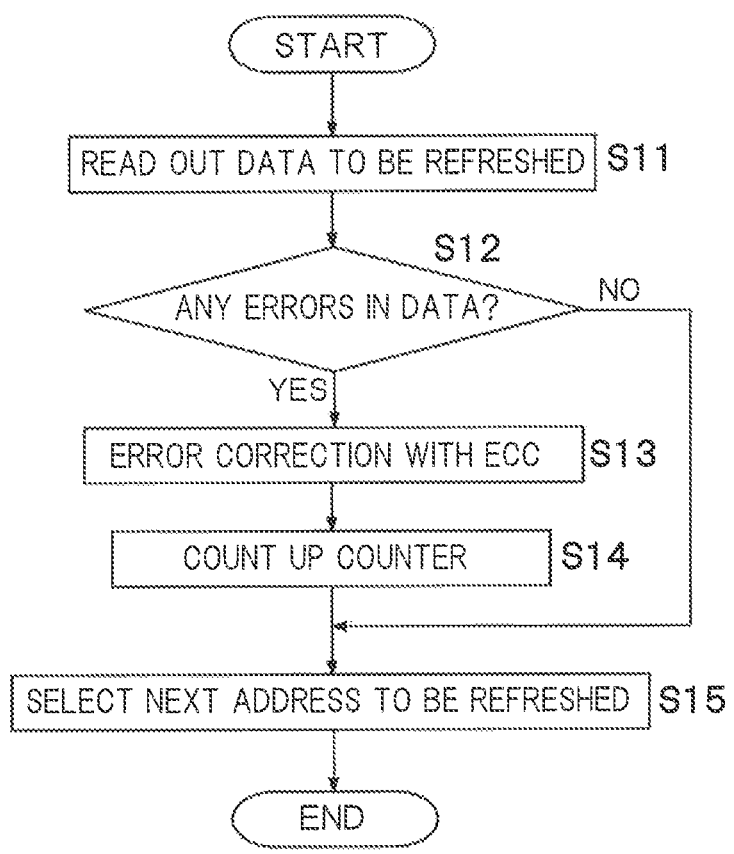
FIG. 9 is a detailed flow chart illustrating a refresh operation of step S1 in FIG. 8.

FIG. 8 is a flow chart illustrating a first example of process operations of the reliability control unit 7. First, a refresh operation is carried out (step S1). FIG. 9 is a detailed flow chart illustrating the refresh operation of step S1 in FIG. 8. Operations of the flow chart in FIG. 9 are carried out by the refresh control unit 11. First, data to be refreshed is read out (step S11). The data to be refreshed is, for example, data after an elapse of a predetermined time from a writing on the first region 4a of the nonvolatile memory. This data will be periodically refreshed after the elapse of the predetermined time from the writing on the first region 4a.

Next, the data readout in step S11 is supplied to the error corrector 8. The error corrector 8 uses ECCs of the data to be refreshed so as to detect whether this data includes any error (step S12). When an error is detected, the error corrector 8 carries out the error correction with the ECCs (step S13). After finishing the process of step S13, a counter 11a which measures error frequency is counted up (step S14).

When determined in step S12 that there is no error, alternatively, when the process of step S14 is finished, the next address to be refreshed is selected (step S15).

After the process of step S1 in FIG. 9, that after the refresh operation of the data to be refreshed is finished, the error rate detector 9 detects an error rate based on the error frequency measured by the counter 11a counted up in step S14 (step S2). Next, the region size adjustment unit 10 determines whether the error rate is equal to or more than a first threshold (step S3). In a case where the error rate is equal to or more than the first threshold, the region size adjustment unit 10 changes the ECC mode so as to enhance the performance of the error correction (step S4). In this case, the region size adjustment unit 10 changes the size of the second region 4b from a first size to a second size which is much larger than the first size.

Next, the region size adjustment unit 10 determines whether the error rate is less than a second threshold which is smaller than the first threshold (step S5). In a case where the error rate is less than the second threshold, the region size adjustment unit 10 changes the ECC mode so as to lower the performance of the error correction (step S6). In a case where the error rate is equal to or more than the second threshold, the ECC mode is maintained in the status quo (step S7).

Next, refresh operations with respect to all of addresses to be refreshed are determined whether they are finished (step S8). If there is still an address to be refreshed, the processes after step S1 are carried out again. After finishing the refresh operations on all of the addresses to be refreshed, the processes in FIG. 8 are completed.

Figure 10:
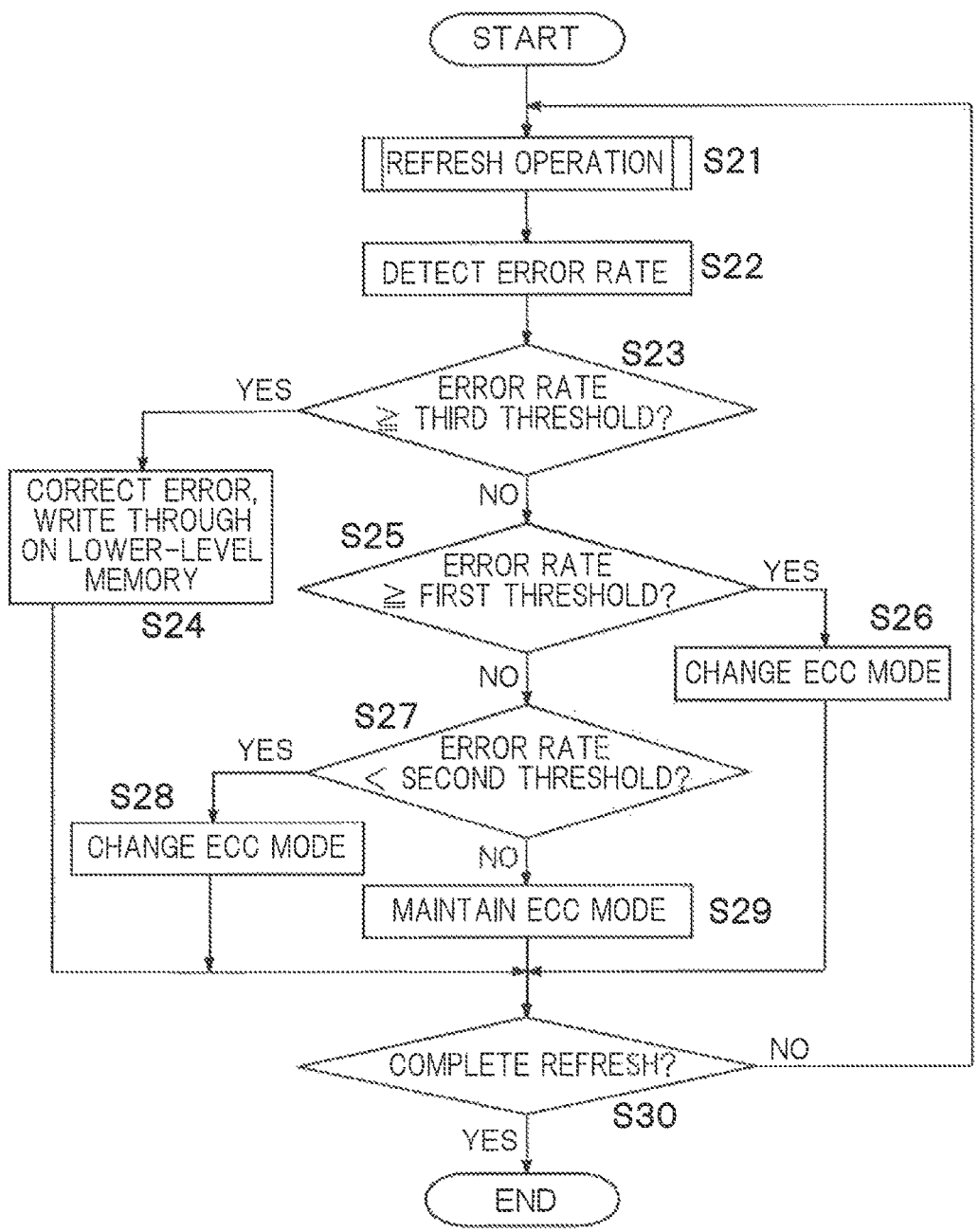
FIG. 10 is a flow chart illustrating a second example of the process operations of the reliability control unit.

The process operations of the reliability control unit 7 are not restricted to those illustrated in FIG. 8. For example, with regard to a set with remarkably low reliability, the reliability control unit 7 may write data written in the set on the lower-level memory by write through. FIG. 10 is a flow chart illustrating a second example of the process operations of the reliability control unit 7. First, a refresh operation is carried out by a process similar to FIG. 9 (step S21). When the refresh operation of data to be refreshed is finished, an error rate is successively detected (step S22). The error rate is then determined whether the error rate is equal to or more than a third threshold which is larger than the first threshold (step S23). In a case where the error rate is equal to or more than the third threshold, the error correction is carried out and also the data is written on the lower-level memory by write through (step S24). Herein, the ECC mode may be changed so as to improve the performance of the error correction.

When determined in step S23 that the error rate is less than the third threshold, the error rate is successively determined whether it is equal to or more than the first threshold (step S25). Thereafter, processes similar to steps S3 to S8 in FIG. 8 are carried out (steps S25 to S30).

Figure 11:
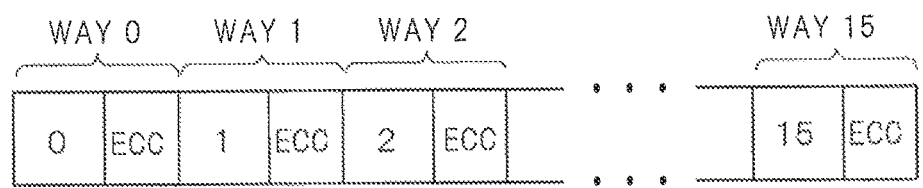
FIG. 11 is a view illustrating an example where the sizes of the first region and the second region in each way are made changeable and adjustable.

In the aforementioned present embodiment, described is the example where the sizes of the first region 4a and the second region 4b are made changeable and adjustable per set in each way. However, as illustrated in FIG. 11, the sizes of the first region 4a and the second region 4b may be made changeable and adjustable in each way. In a case where one way is 512 bits, for example, a part of the 512 bits may be set as the first region 4a and the remaining bits may be set as the second region 4b.

In this manner, in the present embodiment, the size of the second region 4b storing ECCs is adjusted based on the error rate of the data in the first region 4a of the nonvolatile memory. Therefore, in a case where the error rate of the data in the first region 4a is large, the ECCs can be increased and there is a high possibility that the error correction can be reliably carried out on the data in the first region 4a. Accordingly, even in a case where the error rate of the nonvolatile memory becomes high due to the access frequency, aged deterioration, and environmental conditions such as temperatures, it is possible to use the nonvolatile memory without any practical problem.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention is claimed is:

1. A cache memory system, comprising:
   a nonvolatile memory which includes a first region and a second region, the first region storing readable and writable data, the second region storing an ECC (Error Correcting Code) for correcting an error of the data in the first region;
   an error corrector which generates the ECC and carries out an error correction of the data in the first region with the ECC;
   error rate determination circuitry which determines an error rate of the data in the first region;
   region size adjustment circuitry which adjusts sizes of the first region and the second region inside the nonvolatile memory so that a size of one of the first region and the second region increases and a size of another of the first region and the second region decreases based on the error rate, adjusts the size of the second region to a first size when the error rate is less than a first threshold and adjusts the size of the second region to a second size which is larger than the first size when the error rate is equal to or more than the first threshold, and writes data on a lower-level memory of the nonvolatile memory when writing the data on the first region, in a case where the error rate is equal to or more than a second threshold which is larger than the first threshold; and
   an access frequency measurement circuitry which measures access frequency with respect to the second region,
   wherein the region size adjustment circuitry shifts the second region inside the nonvolatile memory when the access frequency measured by the access frequency measurement circuitry reaches a predetermined frequency.

2. The cache memory system according to claim 1, wherein
   the nonvolatile memory carries out readout and writing of data per cache line,
   the error corrector carries out the error correction of the data per cache line,
   the error rate determination circuitry determines the error rate per cache line, and
   the region size adjustment circuitry adjusts the size of the second region per cache line.

3. The cache memory system according to claim 2, wherein
   the nonvolatile memory has a set associative structure including a plurality of ways, each way having a data-bit width of the cache line, and
   the region size adjustment circuitry adjusts the size of the second region per way in each set of the nonvolatile memory based on the error rate.

4. The cache memory system according to claim 1, comprising a controller which periodically reads out data written on the first region inside the nonvolatile memory and supplies the readout data to the error corrector, wherein
   the error rate determination circuitry determines the error rate based on an error included in the data readout by the controller.

5. The cache memory system according to claim 4, wherein
   the controller measures frequency of error occurrence per data in the first region, and
   the error rate determination circuitry determines the error rate of each data in the first region based on the frequency of the error occurrence measured by the controller.

6. The cache memory system according to claim 1, wherein the region size adjustment circuitry shifts the second region inside the nonvolatile memory based on a predetermined condition.

7. The cache memory system according to claim 1, wherein
   the nonvolatile memory comprises a data cache and a tag memory, the data cache comprising the first region and the second region, the tag memory storing address information of the data in the first region, and
   the tag memory stores first information and second information, the first information indicating whether the second region is provided, and the second information specifying a position of the second region.

8. The cache memory system according to claim 7, wherein
   the nonvolatile memory has a set associative structure including a plurality of ways,
   the first region or the second region is set per way in each set,
   the first information is provided per set, and
   the second information specifies a way which is allocated to the second region.

9. The cache memory system according to claim 1, wherein the nonvolatile memory is a magnetoresistive random access memory (MRAM).

10. A processor system comprising:
    a processor; and
    a memory accessed by the processor,
    wherein the memory comprises:
    a nonvolatile memory which includes a first region and a second region, the first region storing readable and writable data, the second region storing an ECC (Error Correcting Code) for correcting an error of the data in the first region;
    an error corrector which generates the ECC and carries out an error correction of the data in the first region with the ECC;
    error rate determination circuitry which determines an error rate of the data in the first region;
    region size adjustment circuitry which adjusts sizes of the first region and the second region inside the nonvolatile memory so that a size of one of the first region and the second region increases and a size of another of the first region and the second region decreases based on the error rate, adjusts the size of the second region to a first size when the error rate is less than a first threshold and adjusts the size of the second region to a second size which is larger than the first size when the error rate is equal to or more than the first threshold, and writes data on a lower-level memory of the nonvolatile memory when writing the data on the first region, in a case where the error rate is equal to or more than a second threshold which is larger than the first threshold; and an access frequency measurement circuitry which measures access frequency with respect to the second region, wherein the region size adjustment circuitry shifts the second region inside the nonvolatile memory when the access frequency measured by the access frequency measurement circuitry reaches a predetermined frequency.

11. The processor system according to claim 10, wherein
the nonvolatile memory carries out readout and writing of data per cache line,
the error corrector carries out the error correction of the data per cache line,
the error rate determination circuitry determines the error rate per cache line, and
the region size adjustment circuitry adjusts the size of the second region per cache line.

12. The processor system according to claim 11, wherein
the nonvolatile memory has a set associative structure including a plurality of ways, each way having a data-bit width of the cache line, and
the region size adjustment circuitry adjusts the size of the second region per way in each set of the nonvolatile memory based on the error rate.

13. The processor system according to claim 10, comprising a controller which periodically reads out data written on the first region inside the nonvolatile memory and supplies the readout data to the error corrector, wherein
the error rate determination circuitry determines the error rate based on an error included in the data readout by the controller.

14. The processor system according to claim 13, wherein
the controller measures frequency of error occurrence per data in the first region, and
the error rate determination circuitry determines the error rate of each data in the first region based on the frequency of the error occurrence measured by the controller.

15. The processor system according to claim 10, wherein
the region size adjustment circuitry shifts the second region inside the nonvolatile memory based on a predetermined condition.

* * * * *